United States Patent
Nguyen et al.

(10) Patent No.: US 10,459,913 B2
(45) Date of Patent: Oct. 29, 2019

(54) DATABASE QUERY PROCESSING

(71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 335 days.

(21) Appl. No.: 14/632,736

(22) Filed: Feb. 26, 2015

(65) Prior Publication Data
US 2016/0253372 A1    Sep. 1, 2016

(51) Int. Cl.
*G06F 16/245*    (2019.01)
*G06F 16/23*    (2019.01)
*G06F 16/22*    (2019.01)

(52) U.S. Cl.
CPC ........ *G06F 16/245* (2019.01); *G06F 16/2282* (2019.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 6,003,024 A * | 12/1999 | Bair | .................... | G06F 16/2477 |
| 6,859,808 B1 * | 2/2005 | Chong | .............. | G06F 17/30327 |
| | | | | 707/741 |
| 7,574,652 B2 * | 8/2009 | Lennon | ............. | G06F 17/30389 |
| | | | | 715/248 |
| 7,769,770 B2 | 8/2010 | Denuit et al. | | |
| 8,060,471 B2 | 11/2011 | Wang | | |
| 8,495,085 B2 | 7/2013 | Cai et al. | | |
| 8,626,779 B2 | 1/2014 | Lee et al. | | |
| 8,768,899 B2 | 7/2014 | Faerber et al. | | |
| 8,775,411 B1 | 7/2014 | Ransil et al. | | |
| 9,311,349 B2 * | 4/2016 | Herrnstadt | ........ | G06F 17/30315 |
| 2004/0022379 A1 * | 2/2004 | Klos | .................. | H04M 3/2263 |
| | | | | 379/201.01 |
| 2005/0149493 A1 | 7/2005 | Yamashita et al. | | |
| 2005/0192989 A1 * | 9/2005 | Adiba | ............... | G06F 17/30371 |
| 2008/0263106 A1 | 10/2008 | Asherman et al. | | |
| 2012/0296883 A1 * | 11/2012 | Ganesh | ............ | G06F 17/30315 |
| | | | | 707/693 |

(Continued)

OTHER PUBLICATIONS

Deepavali Bhagwat; Extreme Bining: Scalable, Parallel Deduplication for Chunk-based File Backup; IEEE; 2009; pp. 1-9 (Year: 2009).*

(Continued)

*Primary Examiner* — Mariela Reyes
*Assistant Examiner* — Jermaine A Mincey
(74) *Attorney, Agent, or Firm* — K&L Gates LLP

(57) ABSTRACT

Various examples are directed to systems and methods for managing a database organized according to a schema. The database may comprise a database file corresponding to a table described by the schema. The database file may comprise a first row entry corresponding to a first row of the table. The first row entry may comprise at least one data item. A command may be received. The command may modify a first data item in the first row of the table. An indication of the modified value for the first data item may be written to a change location at the first file. The first entry may be modified to include a pointer to the indication of the modified value for the first data item.

20 Claims, 6 Drawing Sheets

(56) References Cited

U.S. PATENT DOCUMENTS

2014/0344311 A1* 11/2014 Vingralek ......... G06F 17/30595
707/803

OTHER PUBLICATIONS

"Partial Column Update Feature for Container Managed Persistence," accessed from http://www-01.ibm.com/support/knowledgecenter/SSAW57_8.0.0/com.ibm.websphere.nd.doc/info/ae/ae/cejb_partupd.html?cp=SSAW57_8.0.0%2F1-3-0-9-1-1-0, on or before Jan. 16, 2015.

Prashant S. Sarode, "How to Write Efficient SQL Queries with Tips N Tricks," accessed from http://www.orafaq.com/papers/sqltiptr.pdf, on or before Jan. 16, 2015.

* cited by examiner

DATABASE QUERY PROCESSING

BACKGROUND

Databases play an increasingly important role in modern life and business. Businesses have come to use databases in any number of different contexts. Human resource departments use databases to store data describing employees, including, compensation information, address information, etc. Sales and marketing departments use customer relationship management (CRM) databases to store data describing customers including, for example, purchases, product preferences, etc. Information technology (IT) departments use databases for many purposes including, for example, storing data describing computer devices, software applications, etc. Consumers too are becoming increasingly dependent on databases. For example, a typical computer device user may use a media application that maintains a database of available media files, a calendar or e-mail application that maintains a database of personal and/or business contacts, a financial application that maintains a database of financial records, and others.

Database clients access and modify data stored in a database by submitting queries to a database management system (DBMS) associated with the database. The amount of time necessary for the DBMS to reply to the query can depend on various factors including, for example, the type of query, the size of the database, the number of clients querying the database, and the efficiency of query processing.

SUMMARY

Various examples are directed to systems and methods for managing a database organized according to a schema. The database may comprise a database file corresponding to a table described by the schema. The database file may comprise a first row entry corresponding to a first row of the table. The first row entry may comprise at least one data item. A command may be received. The command may modify a first data item in the first row of the table. An indication of the modified value for the first data item may be written to a change location at the first file. The first entry may be modified to include a pointer to the indication of the modified value for the first data item.

In some example, a query for the first data item may be received. If the client has not previously received a result for the query, a plurality of row entries comprising the first row entry may be loaded from the first file. The loaded first row entry may be modified to replace the pointer with the modified value for the first data item. The modified value for the first data item may be returned to the client.

FIGURES

Various example embodiments are described herein in conjunction with the following figures, wherein.

DESCRIPTION

Various example embodiments are directed to systems and methods for efficiently processing database queries. In various examples, a database comprising data items that are logically organized according to a database schema may be physically organized by a file system into one or more data files or other data objects. Database tables from the schema may be written to a data file as a set of sequential row entries. The row entries may be ordered based on the position of the rows in the table. To identify and/or modify a particular data item in a database table, a database management system (DBMS) may traverse the file including the table, identify a row entry corresponding to the row that includes the data element, and then perform desired read or write operations directly on the row entry.

In various examples, the DBMS may be configured to optimize queries to efficiently identify changes made to the database, or a table thereof, relative to a reference point. For example, instead of writing changes directly to a row entry of a table file, the DBMS may be programmed to write a change entry describing the changes to a change location in the table file. The relevant row entry may be modified to point to the change entry at the change location. When a subsequent query references the row corresponding to the row entry, the DBMS may refer to the change entry to determine the current state of the row.

Reference will now be made in detail to several examples, which are illustrated in the accompanying figures. Wherever practical, similar or like reference numbers may be used in the figures and may indicate similar or like functionality. The figures depict examples of the disclosed systems (or methods) for purposes of illustration only. One skilled in the art will readily recognize from the following description that alternative examples of the structures and methods illustrated herein may be employed without departing from the principles described herein.

Figure 1:
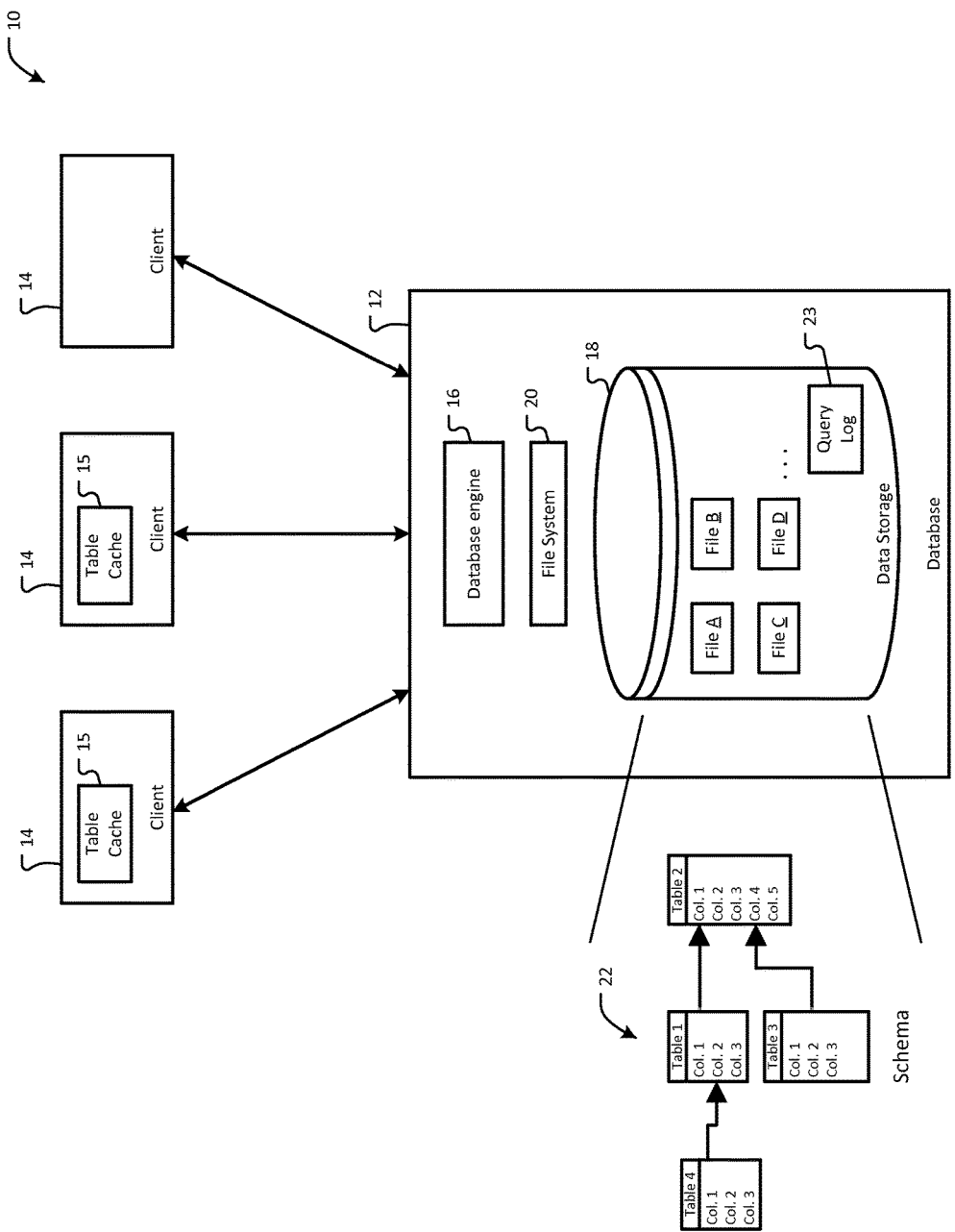
FIG. 1 is a diagram showing one example of an environment for providing database query processing.

FIG. 1 is a diagram showing one example of an environment 10 for providing database query processing. The environment 10 comprises a database 12 and one or more clients 14. The database 12 comprises a database management system (DBMS) 16, and one or more data storage devices 18. Physical storage on the data storage device 18 may be organized according to a file system 20. The DBMS 16 may be a software application that facilitates interaction between the database 12 other components of the environment 10. For example, the DBMS 16 may have an associated data definition language describing commands that may be executed to interact with the database. Examples of suitable DBMS's include MySQL, MariaDB, PostgreSQL, SQLite, Microsoft SQL Server available from the MICROSOFT CORPORATION, various DBMS's available from ORACLE CORPORATION, various DBMS's available from SAP AG, IBM DB2, available from THE INTERNATIONAL BUSINESS MACHINES CORPORATION, etc.

The DBMS 16 may receive queries from clients 14, execute the queries on the database 12, and, if necessary, provide replies to the requesting client 14. In some examples, as described herein, some or all of the clients 14 may maintain one or more table caches 15. Table caches 15 may include a state of table of the database 12 at a particular reference point. Clients 14 may be any suitable applications that direct queries or other requests to the DBMS 15. Clients 14 may be executed on any suitable computing device or devices. In some examples, one or more clients 14 may be executed on the same computing device or devices as other components of the environment 10 such as, for example, the database 12. In some examples, one or more clients 14 may be executed on stand-alone computing devices that are not part of any other components of the environment 10.

The database 12 may be logically organized according to a database schema 22. For example, the database schema 22 may describe logical relationships between data items of the database base 12 in terms of related database objects such as, tables, indices, etc. Each table may comprise data items organized into rows and columns. The columns in a table may describe a data category or type. Each row may comprise a set of data items, with each data item in a row corresponding to one of the columns of the table. The example schema 22 shown in FIG. 1 includes four example tables labeled Table 1, Table 2, Table 3, and Table 4. It will be appreciated, however, that the systems and methods described herein may be utilized with schemas including different numbers and combinations of tables, indices, etc.

Tables and other database objects logically described by the schema 22 may be physically stored at the data storage device 18 in any suitable manner. For example, the DBMS 16 may utilize the file system 20 to store the data items making up the database to the data storage device 18. The file system 20 may organize data at the data storage device 18 into files A, B, C, D. Any suitable file system may be used including, for example, Global File System (GFS), File Allocation Table 16 (FAT16), File Allocation Table 32 (FAT32), NTFS, High Performance File System (HPFS), or any UNIX or Linux file system. Although the file system 20 is described herein as organizing the schema 22 into files, any other suitable types of data objects may be used.

The files A, B, C, D may comprise row entries from the various tables Table 1, Table 2, Table 3, Table 4. A row entry may comprise data items making up the row. For example, data items in a row entry may be positioned in an order corresponding to the order of columns in a table. In some examples, there is a one-to-one correlation between files and tables. For example, each table may be represented in one file. In other examples, row entries for a single table may be spread across multiple files and/or a single file may comprise row entries from more than one table. For example, the physical position of a table may be described by a file and an offset within the file to a position where the table begins.

In the example described by FIG. 1, each table, Table 1, Table 2, Table 3, Table 4 comprises a unique corresponding file. In the example, of FIG. 1, file A corresponds to Table 1, file B corresponds to Table 2, file C corresponds to Table 3 and file D corresponds to Table 4. Accordingly, each file, A, B, C, D may comprise sequentially positioned row entries corresponding to the rows of its associated table. As an example illustration, Table 1 is provided below:

TABLE 1

| Col. 1 |
| Col. 2 |
| Col. 3 |

Corresponding file A is provided below:

| File A |
| --- |
| Row 1; Row 2; Row 3; Row 4; Row 5 . . . |

Row entries in File A are indicated by Row 1, Row 2, and so on. Each row entry may comprise a set of data items ordered according to the columns of Table 1 as indicated above. For example, the row entry Row 1 may comprise data items as indicated below:

| Row 1 |
| --- |
| Col_1_data_item; Col_2_data_item; Col_3_data item |

The data item Col_1_data_item may be a data item of a type indicated by Col. 1; the data item Col_2_data_item may be a data item of a type indicated by Col. 2, and so on.

According to various examples, the DBMS 16 may receive from a client 14 a request to modify a row of one of the tables of the schema 22 (e.g., one or more of the data items of the row). The DBMS 16 may write the modification to the data storage 18 in a manner that optimizes queries to identify changes relative to a reference point (e.g., a reference point in time). This may facilitate client caching. For example, a client 14 may keep a table cache 15 of a table from the schema 22. The client 14 may periodically query the DBMS 16 for the current state of the table. The DBMS 16 may respond by providing an indication of changes made to the table since the last query from the client 14.

The various components of the environment 10 may be implemented using any suitable computing devices or combination of computing devices including, for example, servers, data storage devices, etc. The various components of the environment 10 may be in communication with one another via any suitable network including, for example, any suitable type of wired, wireless, and/or mixed network. The network may include, for example, the Internet, a local area network (LAN), a wide area network (WAN), etc.

Figure 2:
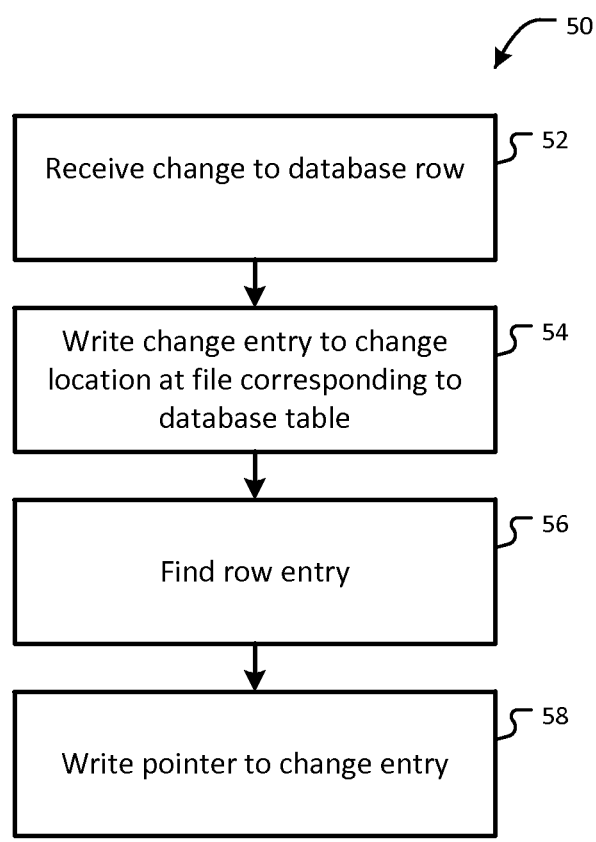
FIG. 2 is a flow chart showing one example of a process flow for writing a modification to a database table.

FIG. 2 is a flow chart showing one example of a process flow 50 for writing a modification to a database table. At 52, the DBMS 16 may receive a request to modify a database table. In some examples, the request may indicate: the table to be modified, a row of the table to be modified, a data item from the row to be modified, and a modified value for data item. At 54, the DBMS 16 may write a change entry to change location of a file or other data object associated with the indicated table. For example, the DBMS 16 may direct a write request requested that the change entry be added to the file. The write request may be directed to the file system 20. The change entry may indicate the modified value for the data item and an indicator of the column corresponding to the data item. The indicator of the column may allow the modified value for the data item to be placed within the row or row entry, as described herein. At 56, the DBMS 16 may identify the row entry corresponding to the modified data item. For example, the DBMS 16 may direct a read request to the file system 20 requesting that the file system 20 return the file. The DBMS 16 may then traverse row entries in the file until it locates the row entry comprising the modified data item. At 58, the DBMS 16 may write a pointer to the row entry. The pointer may point to the change entry written at 54. In some examples, the DBMS 16 may direct a read request to the file system 20 to retrieve the file. Changes may be made to the file, as indicated in the process flow 50. The modified file may then be written back to the data storage 18 by directing a write request to the file system 20.

Figure 3:
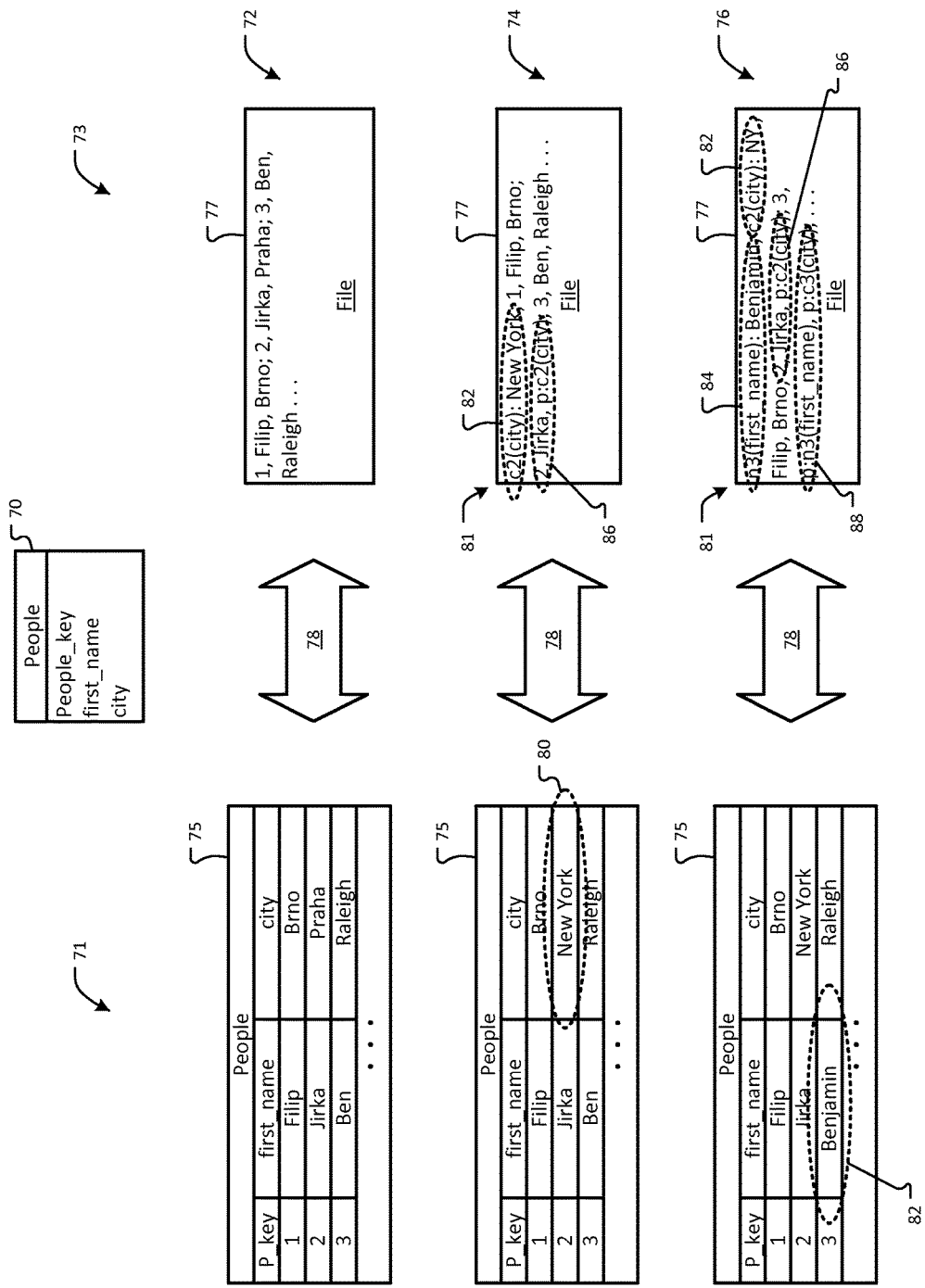
FIG. 3 is a diagram showing example modifications to a database table implemented according to the process flow.

FIG. 3 is a diagram showing example modifications to a database table implemented according to the process flow 50. A table definition 70 for the example table People shows that that People includes three columns. A column P_key includes keys for the various rows of the table. A column first_name includes first names for people indicated in the table. A column city includes cities where the people indicated in the table reside. Although the example table People includes three columns, tables modifiable by the methods and systems described herein may have any suitable number of columns. Below the table definition 70, FIG. 3 comprises two columns 71, 73. Column 71 shows logical representations 75 of the example table People including columns, rows and corresponding data entries. Column 73 shows a representation of a file 77 or other data object according to which the table People may be stored at the data storage 18. Logical representations from column 71 and corresponding states of the file are indicated by arrows 78.

A first reference point 72 corresponds to an initial state of the table People. At column 71, the logical representation 75 shows three example rows having P_keys 1, 2, and 3. Although three example rows are shown, the table People may have any suitable number of rows. Referring to column 73 at the reference point 72, the file 77 may comprise three row entries:

| |
|---|
| 1, Filip, Brno |
| 2, Jirka, Praha |
| 3, Ben, Raleigh |

Each row entry, as indicated, may comprise a data item corresponding to each of the columns of the table People. For example, referring to the row entry "1, Filip, Brno," the data item "1" corresponds to the P_key column; the data item "Filip" corresponds to the first_name column; and the data item "Brno" corresponds to the city column.

At reference point 74, the data item corresponding to the row with P_key "2" and the column city has been modified from "Praha" to "New York." The change is indicated in the logical representation 75 by the reference indicator 80. Referring to the file 77, a change entry 82 is written to the file 77 at a change location 81. In the example of FIG. 3, the change location 81 is at the beginning of the sequential listing of row entries. In other examples, the change location 81 may at other locations including, for example, at the end of the sequential listing of row entries or in another file or data object. The change entry 82 may comprise an indicator of the row of the data item to which is pertains (e.g., a key value for the row), an indicator of the column of the data item to which it pertains (e.g., a name of the column), and a new value for the data item. For example, the change entry 82 is reproduced below:

c2(city): New York

Here, "c2" indicates the key (e.g., P_key) of the row of the modified data item. The parenthetical "(city)" indicates the relevant column (e.g., city), and the value "New York" indicates the new value for the data item. The row entry 86 for the row "2" is also modified, as described herein. In place of the previous value for the data item (i.e, "Praha"), the row entry 86 comprises a pointer to the change entry 82 (e.g., "p:c2(city)").

Reference point 76 shows a change to an additional data item corresponding to the row with P_key "3" and the column first_name. The data item at this location has been modified from "Ben" to "Benjamin." A change entry 84 is written to the data file 77 at the change location 81. Change entries written to a file may be maintained in a sequenced relationship that indicates the order in which the changes were made. As illustrated, the change entry 84 is written prior to the change entry 82 although, in some examples, the subsequent change entry 84 may be written after the prior change entry 82. The change entry 84 is reproduced below:

n3(first_name): Benjamin

Here, "n3" indicates the key (e.g., P_key) of the row of the modified data item. The parenthetical "first_name" indicates the relevant column (e.g., first_name) and the value "Benjamin" indicates the new value for the data item. The row entry 88 for the row "3" is also modified as described herein. In place of the previous value for the data item (i.e., "Ben"), the row entry 88 comprises a pointer to the change entry 84 (e.g., p:n3(first_name)).

Figure 4:
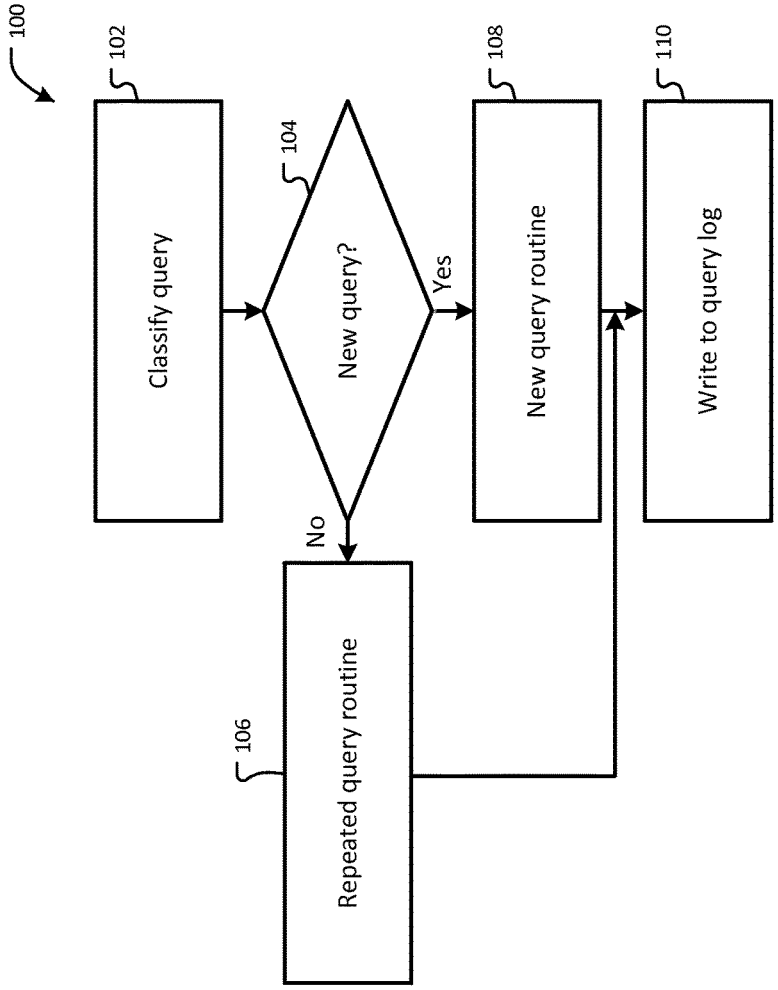
FIG. 4 is a flow chart showing one example of a process flow that may be executed by the database management system of FIG. 1 to respond to a query from a client relative to a reference point.

In various examples, the DBMS 16 may be configured to respond to queries from clients 14 relative to a reference point. The reference point, for example, may be a previous query made by the same client 14. FIG. 4 is a flow chart showing one example of a process flow 100 that may be executed by the DBMS 16 to respond to a query from a client 14 relative to a reference point. The query, for example, may request the state of one or more data items at the database 12 organized as described herein. At 102, the DBMS 16 may classify the query as either a new query or a repeated query. A new query may be a query that a particular client 14 has not previously made. A repeated query, on the other hand, may be a query that a particular client 14 has made previously. In various examples, the DBMS 16 may refer to the query log 23 (FIG. 1) to determine whether a particular query is a new query or a repeated query.

If, at 104, the DBMS 16 determines that the query is a new query, then the DBMS 16 may respond to the query according to a new query routine (108). Additional details of an example new query routine are provided herein with respect to FIG. 5. For example, the new query routine may return a response indicating the current state of the request data item or data items. If at 104, the DBMS 16 determines that the query is a repeated query, then it may respond to the query according to a repeated query routine (106). Additional details of an example repeated query routine are provided herein with respect to FIG. 6. For example, the repeated query routine may return a response indicating changes, if any, to the requested data item or items since the last instance of the query made by the client 14. In some examples, upon receiving the response, the client 14 may update a table cache 15 to reflect the indicated changes. In some examples, after executing either the new query routine or the repeated query routine, the DBMS 16 may, at 110, write the query and/or data describing the query to the query log 23. The DBMS 16 may use the query log 23, as described herein, to determine whether a query is new or repeated and/or to determine a reference point for a repeated query (e.g., the time when a client 14 last sent an instance of the query).

Figure 5:
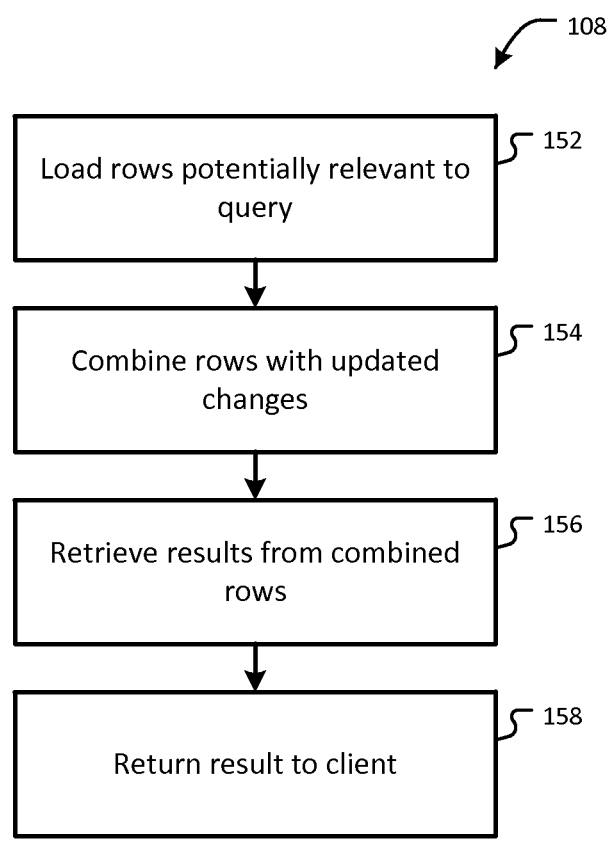
FIG. 5 is a flow chart showing one example of a process flow that may be executed by the database management system of FIG. 1 to process a new query.

FIG. 5 is a flow chart showing one example of a process flow 108 that may be executed by the DBMS 16 to process a new query. For example, the process flow 108 may represent the new query routine described herein. The process flow 108 may be executed by the DBMS 16, for example, upon receipt of a query that is new (e.g., a query that the client 14 originating the query has not previously made). In various embodiments, the new query may indicate a table selected from the schema describing the database. At 152, the DBMS 16 may load row entries corresponding to rows that are potentially responsive to the query. Rows potentially responsive to the query may be identified in any suitable manner. For example, the DBMS 16 may utilize standard query processing algorithms including, for example, algorithms that utilize indexes. For example, the row entries may be loaded to a cache location, such as a memory location or a persistent data storage location distinct from the original location of the row entries at the data storage 18. At 154, the DBMS 16 may combine the loaded row entries with changes indicated at a change location of the file to derive a current state of the rows. This may create an up-to-date version of the row entries at the cache location. The DBMS 16 may perform this action in any suitable manner. In some examples, the DBMS 16 may begin by examining change entries at the change location of the file. The DBMS 16 may locate the row entry indicated by each change entry and replace the data item at the column indicated by the change entry with the replacement value indicated by the change entry. Also, in some examples, the DBMS 16 may traverse the row entries. When the DBMS 16 encounters a data item pointing to a change entry, the DBMS 16 may retrieve from the indicated change entry the replacement value for the data item. At 156, the DBMS 16 may retrieve results for the new query from the current state of the rows derived at 154. At 158, the DBMS 16 may return the result to the requesting client 14.

Figure 6:
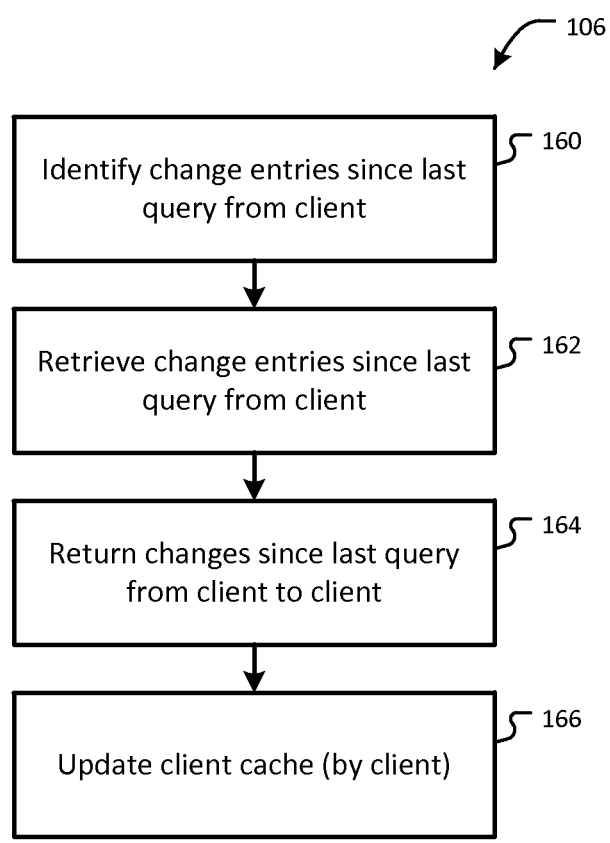
FIG. 6 is a flow chart showing one example of a process flow that may be executed by the database management system of FIG. 1 to process a repeated query.

FIG. 6 is a flow chart showing one example of a process flow 106 that may be executed by the DBMS 16 to process a repeated query. For example, the process flow 106 may represent the repeated query routine described herein. The process flow 106 may be executed by the DBMS 16, for example, upon receipt of a query that is repeated (e.g., a query that the client 14 originating the query has made previously). At 160, the DBMS 16 may identify changes made to the database 12 since the previous query received from the client 14. In some examples, the DBMS 16 may identify only changes to tables and/or rows that are responsive to the query. The changes may be identified in any suitable manner. For example, when the DBMS 16 writes a query to the query log 23, it may also write a timestamp indicating when the query was received. Change entries written to various files may include similar time stamps. Accordingly, the DBMS 16 may identify change entries with time stamps after the time stamp of the most recent query from the client 14. Also, in some examples, changes to the database 12 may be logged sequentially at the query log 23 along with received queries. The DBMS 16 may identify changes since the previous query received from the client 14 by traversing the query log 23 to identify any changes listed before reaching the indication of the previous query received from the client 14. At 162, the DBMS 16 may retrieve change entries corresponding to the changes identified at 160. At 164, the retrieved change entries may be provided to the client 14 in response to the repeated query. Optionally, at 166, the client 14 may use the provided change entries to update one or more table caches 15 stored at the client 14.

In various examples, the DBMS 16 may be programmed to respond to a query requesting changes relative to a reference point (e.g, a reference time). For example, a client 14 may submit a query that indicates a reference time. The DBMS 16 may identify changes since the reference time, for example, by referring to a time-stamped query log 23. Change entries corresponding to the identified changes may be retrieved from the appropriate files or other data objects and provided to the client 14 in response to the query. In this way, a client 14 may request changes relative to a reference point (e.g., a reference time) without having previously made the same query to the DBMS 16.

Reference in the specification to, "examples," "various examples," "some examples," etc. means that a particular feature, structure, or characteristic described in connection with the examples is included in at least one example of the invention. The appearances of the above-referenced phrases in various places in the specification are not necessarily all referring to the same example. Reference to examples is intended to disclose examples, rather than limit the claimed invention. While the invention has been particularly shown and described with reference to several examples, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It can be appreciated that, in some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. It can be appreciated that such examples are intended primarily for purposes of illustration. No particular aspect or aspects of the example method, product, computer-readable media, and/or system examples described herein are intended to limit the scope of the present disclosure.

It will be appreciated that the various components of the environment 100 may be and/or be executed by any suitable type of computing device including, for example, desktop computers, laptop computers, mobile phones, palm top computers, personal digital assistants (PDA's), etc. As used herein, a "computer," "computer system," "computer device," or "computing device," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure can be embodied in software, firmware or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. It will be appreciated that a variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

We claim:

1. A system for managing a relational database organized according to a schema, the system comprising:
   a computer-readable medium, the computer-readable medium comprising a first file, wherein the first file stores a relational database table described by the schema, the first file comprises a sequence of row entries, each row entry in the sequence of row entries corresponds to a row of the table, and each row entry in the sequence of row entries comprises a sequence of data items in the row corresponding to the row entry; and
   at least one processor in communication with the computer-readable medium and programmed to:
      receive a command to modify a value of a first data item of the relational database table, wherein the command indicates a modified value for the first data item;
      responsive to receiving the command and without modifying the schema, write a first change entry to the first file prior to the sequence of row entries, wherein the first change entry comprises the modified value for the first data item, and an indicator of a column corresponding to the first data item;
      identify from the sequence of row entries a first row entry comprising the first data item; and
      without modifying the schema, write to the first row entry, at a position corresponding to the first data item, a pointer to the first change entry that associates the first change entry to the first row entry without updating the first row entry with the modified value for the first data item during a response to the command to modify.

2. The system of claim 1, wherein the at least one processor is further programmed to:
- receive, from a client, a query for a plurality of data items comprising the first data item;
- responsive to receiving the query, determine that the client has not previously received a result for the query;
- load to a cache location and from the first file a set of row entries selected from the sequence of row entries, wherein the set of row entries corresponds to rows potentially relevant to the query, and wherein the set of row entries comprises the first row entry;
- at the cache location, create a modified first row entry by replacing the pointer with the modified value for the first data item; and
- return to the client a result of the query, wherein the result comprises the modified first row entry value.

3. The system of claim 1, wherein the at least one processor is further programmed to:
- receive, from a client, a query for a plurality of data items comprising the first data item, wherein the plurality of data items include pointers to a plurality of change entries that include respective modified values associated with respective data items of the plurality of data items;
- responsive to receiving the query, determine that the client has previously received a first result for the query in response to a previous iteration of the query, wherein the first result includes a first subset of the plurality of change entries;
- identify, based on a sequence of the plurality of change entries, a second subset of the plurality of change entries that have been added to the first file since the first result was sent to the client; and
- return to the client a second result of the query, wherein the second result comprises the second subset of change entries.

4. A system for managing a relational database organized according to a schema, the system comprising:
- a computer-readable medium, the computer-readable medium comprising a first file storing a relational database table described by the schema, wherein the first file comprises a first row entry, the first row entry corresponds to a first row of the table, and the first row entry comprises at least one data item; and
- at least one processor in communication with the computer-readable medium and programmed to:
  - receive a command to modify a value of a first data item in the first row of the table, wherein the command indicates a modified value for the first data item;
  - responsive to receiving the command and without modifying the schema, write an indication of the modified value for the first data item to a change location at the first file;
  - identify the first row entry from the first file; and
  - without modifying the schema, write to the first row entry a pointer to the indication of the modified value for the first data item that associates the modified value to the first row entry and the first data item without updating the first row entry with the modified value for the first data item during a response to the command to modify.

5. The system of claim 4, wherein the at least one processor is further programmed to write to the change location at the first file, in association with the modified value for the first data item, an indicator of a column corresponding to the first data item.

6. The system of claim 4, wherein the first file comprises a set of sequential row entries comprising the first row entry, and wherein the change location at the first file is prior to the set of sequential row entries.

7. The system of claim 4, wherein the first file comprises a set of sequential row entries comprising the first row entry, and wherein the change location at the first file is after the set of sequential row entries.

8. The system of claim 4, wherein the at least one processor is further programmed to:
- receive, from a client, a query for the first data item;
- responsive to receiving the query, determine that the client has not previously received a result for the query;
- load a plurality of row entries, the plurality of row entries comprising the first row entry;
- modify the loaded first row entry to replace the pointer with the modified value from the change location for the first data item; and
- return to the client a result of the query, wherein the result comprises the modified value for the first data item.

9. The system of claim 8, wherein the at least one processor is further programmed to write to a query log an indication that the client received the result of the query.

10. The system of claim 9, wherein the at least one processor is further programmed to:
- receive a command to modify a value of a second data item in the first row of the table, wherein the command indicates a modified value for the second data item;
- responsive to receiving the command and without modifying the schema, write an indication of the modified value for the second data item to the change location at the first file; and
- without modifying the schema, write to the first row entry, at a position corresponding to the second data item, a pointer to the indication of the modified value for the second data item.

11. The system of claim 10, wherein the at least one processor is further programmed to write to the query log an indication of the command to modify the value of the second data item.

12. The system of claim 4, wherein the at least one processor is further programmed to:
- receive, from a client, a query to the relational database;
- responsive to receiving the query, determine that the client has previously received a result of the query;
- identify at least one data item value change to the relational database that has occurred since the client previously received the result of the query;
- read from the change location at least one data item value corresponding to the at least one change; and
- transmit the at least one data item value to the client.

13. The system of claim 4, wherein the at least one processor is further programmed to:
- receive from a client a query for the first data item;
- responsive to receiving the query, determine that the client has previously received a result of the query;
- identify at least one modified value for a data item at the change location of the first file that has been added to the first file since the client previously received the result of the query, wherein the at least one modified value for the data item comprises the modified value for the first data item; and
- return to the client a result of the query, wherein the result of the query comprises at least one change entry that includes the modified value for the first data item.

14. The system of claim 4, wherein the first file also comprises at least one row entry corresponding to a row of a second table described by the schema.

15. A system for managing a relational database organized according to a schema, the system comprising:
- a computer-readable medium, the computer-readable medium comprising a first file storing a relational database table described by the schema, wherein the first file comprises:
  - a first change entry comprising a modified value for a first data item, wherein the first change entry is written to a change location of the first file without a modification to the schema; and
  - a first row entry, wherein the first row entry corresponds to a first row of the table, the first row entry lacks the modified value, and wherein the first row entry comprises at a position corresponding to the first data item, a pointer to the first change entry that associates the first change entry to the first row entry; and
- at least one processor in communication with the computer-readable medium and programmed to:
  - receive from a client a query for the first data item;
  - responsive to receiving the query, determine that the client has not previously received a result for the query;
  - load from the first file a plurality of row entries, the plurality of row entries comprising the first row entry;
  - modify the loaded first row entry to replace the pointer with the modified value for the first data item; and
  - return to the client a result of the query, wherein the result of the query comprises the modified value for the first data item.

16. The system of claim 15, wherein the at least one processor is further programmed to:
- receive from a second client a second query for the first data item;
- responsive to receiving the second query, determine that the second client has previously received a result of the second query;
- identify at the change location at least one change entry that has been added to the first file without modifying the schema since the second client previously received the result of the second query, the at least one change entry comprising the first change entry; and
- return to the second client a second result of the second query, wherein the second result of the second query comprises the at least one change entry.

17. The system of claim 15, wherein the first file comprises a set of sequential row entries comprising the first row entry, and wherein the change location at the first file is prior to the set of sequential row entries.

18. The system of claim 15, wherein the first file comprises a set of sequential row entries comprising the first row entry, and wherein the change location at the first file is after the set of sequential row entries.

19. The system of claim 15, wherein the first change entry further comprises an indication of a column corresponding to the first data item.

20. The system of claim 15, wherein the first file also comprises a second row entry corresponding to a first row of a second table described by the schema.

* * * * *